US009332004B2

(12) United States Patent
Warrier (10) Patent No.: US 9,332,004 B2
(45) Date of Patent: May 3, 2016

(54) DIGITAL CONTENT ACQUISITION SYSTEM AND TECHNIQUES

(75) Inventor: Padmanand Warrier, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1124 days.

(21) Appl. No.: 12/482,672

(22) Filed: Jun. 11, 2009

(65) Prior Publication Data

US 2010/0319064 A1 Dec. 16, 2010

(51) Int. Cl.
| | |
|---|---|
| G06F 7/04 | (2006.01) |
| G06F 15/16 | (2006.01) |
| G06F 17/30 | (2006.01) |
| H04L 29/06 | (2006.01) |
| H04L 9/32 | (2006.01) |
| G06K 7/14 | (2006.01) |
| G06Q 20/32 | (2012.01) |
| G06Q 10/06 | (2012.01) |
| G06Q 30/06 | (2012.01) |
| H04L 29/08 | (2006.01) |

(52) U.S. Cl.
CPC ........ *H04L 63/083* (2013.01); *G06F 17/30879* (2013.01); *G06K 7/1404* (2013.01); *G06K 7/1413* (2013.01); *G06K 7/1417* (2013.01); *G06K 7/1421* (2013.01); *G06K 7/1426* (2013.01); *G06Q 10/06* (2013.01); *G06Q 20/3274* (2013.01); *G06Q 20/3276* (2013.01); *G06Q 30/0603* (2013.01); *H04L 63/10* (2013.01); *H04L 67/06* (2013.01)

(58) Field of Classification Search
CPC .......... G06Q 20/3274; G06Q 20/3276; G06K 7/1404; G06K 7/1413; G06K 7/1417; G06K 7/1421; G06K 7/1426; G06K 19/06028
See application file for complete search history.

(56) References Cited

U.S. PATENT DOCUMENTS 6,311,214 B1 * 10/2001 Rhoads .................... 709/217
6,512,919 B2    1/2003 Ogasawara
(Continued)

OTHER PUBLICATIONS

"The Pondering Primate", Retrieved at <<http://theponderingprimate.blogspot.com/2008/01/graphic-packagings-snap2c-connects.html>>, Jan. 9, 2008, pp. 1-16.
(Continued)

*Primary Examiner* — Azizul Choudhury
(74) *Attorney, Agent, or Firm* — Bryan Webster; Judy Yee; Micky Minhas (57) ABSTRACT

A network- and/or client-side digital content acquisition system facilitates automatic and simplified transactions, between a user of a consumer electronic device ("CED") and a digital content source, for authorizing access to digital content items ("DCIs"). Computer-readable visual symbols are associated with DCIs. A particular computer-readable visual symbol has a visual symbology, presented on a surface, which encodes information regarding DCIs, sources responsible for authorizing access to the DCIs, and consideration (if any) due from a user. A user of a particular CED identifies, and uses the CED to reproduce and decode, a particular computer-readable visual symbol. Upon reproduction and/or decoding, the CED automatically requests access to the DCI, and provides a security token that links the user and the CED, and automatically authorizes transfer of consideration (if any) due from the user. Upon authentication of the security token, the user automatically receives access to the DCI.

15 Claims, 3 Drawing Sheets

(56) References Cited

U.S. PATENT DOCUMENTS

| | | | |
|---|---|---|---|
| 7,780,081 B1* | 8/2010 | Liang | 235/383 |
| 2005/0102233 A1* | 5/2005 | Park et al. | 705/44 |
| 2005/0165784 A1* | 7/2005 | Gomez et al. | 707/9 |
| 2005/0187873 A1* | 8/2005 | Labrou et al. | 705/40 |
| 2009/0069000 A1* | 3/2009 | Kindberg et al. | 455/414.3 |

OTHER PUBLICATIONS

Ballagas, et al., "The Smart Phone: A Ubiquitous Input Device", Retrieved at <<http://ieeexplore.ieee.org/stamp/stamp.jsp?arnumber=01593574>>, Pervasive Computing, IEEE Pervasive Computing, vol. 5, No. 1, Jan.-Mar. 2006, pp. 70-77.

Rukzio, et al., "Telling a Story on a Tag: The Importance of Markers' Visual Design for Real World Applications", Retrieved at <<http://www.hcilab.org/events/mirw2006/pdf/mirw2006_proceedings.pdf>>, Proceedings of the Workshop Mobile Interaction with the Real World, 8th International Conference on Human Computer Interaction with Mobile Devices and Services, Sep. 2006, pp. 1-59.

Castelluccia, et al., "Noisy Tags: A Pretty Good Key Exchange Protocol for RFID Tags", Retrieved at <<http://lasecwww.epfl.ch/pub/lasec/doc/CA06.pdf>>, Smart Card Research and Advanced Applications, 7th IFIP WG 8.8/11.2 International Conference, CARDIS 2006, vol. 3928, 2006, pp. 11.

* cited by examiner

FIG. 3 ered to user1 151 and

DIGITAL CONTENT ACQUISITION SYSTEM AND TECHNIQUES

BACKGROUND

Digital content (such as video, audio, images, graphics, playlists, multimedia files, text, service subscriptions, and computer programs) is available from an ever-increasing variety of sources. Many consumer electronic devices are equipped with connectivity features that allow the devices to communicate via networks and with other devices.

Obtaining digital content using an electronic device such as a personal computer, personal digital assistant, mobile phone, navigation device, media player, media capture device, and the like often involves multiple steps, including: connecting to one or more network-side digital content sources such as an online store; searching for and discovering the desired digital content; often multi-step authentication/authorization activities between the electronic device and the online store that may involve the user of limited-function input devices such as small screens or keypads; and transferring the digital content to the electronic device.

Discovering fresh digital content generally requires active engagement with various content sources, and the many user actions involved in obtaining such content have the potential to become onerous and time consuming.

SUMMARY

Techniques for discovering and obtaining digital content from a wide variety of sources in a simplified manner, along with flexible options for sharing/referring the digital content, are described herein. One technique involves implementing a network- and/or client-side digital content acquisition system, which features the association of computer-readable visual symbols such as optical graphic codes (for example, tags, barcodes, or matrix codes) with particular items of digital content. Generally, a particular computer-readable visual symbol has a visual symbology that encodes information regarding one or more digital content items, information regarding one or more sources responsible for authorizing access to the one or more digital content items, and consideration (if any) due from a user in exchange for receiving access to the digital content item.

In one exemplary scenario, a user of a particular consumer electronic device identifies, and uses the consumer electronic device to reproduce and decode, a particular computer-readable visual symbol from a surface on which it is presented (such as a user interface of an electronic device, or a physical surface such as paper, glass, fabric, metal, etc.) Exemplary techniques for reproduction include but are not limited to copying electronically (from a network-based location or from a different consumer electronic device, for example), and capturing an image using an image capture device.

Generally, the act of reproduction and/or decoding automatically results in the transmission of a request (to the digital content source or another network-side service) for access to the digital content item. The request includes a security token that links the user and the consumer electronic device, and automatically authorizes transfer of consideration (if any) due from the user. Upon authentication of the security token, the user automatically receives access to the digital content item (for example, via a wireless transmission). If the digital content item is a computer program or a subscription to a service, installation steps may also be completed automatically.

In this manner, a transaction between a user and a digital content source, which provides the user with access to a digital content item, is simplified to occur automatically when the user reproduces and/or decodes the computer-readable visual symbol associated with the digital content item using his consumer electronic device. The user may also enable others to easily access content, without establishing a trust relationship between users or devices, by sharing the visual symbol with other consumer electronic devices via any available networks or surfaces.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

DETAILED DESCRIPTION

A network- and/or client-side digital content acquisition system and techniques are discussed herein. Computer-readable visual symbols such as optical graphic codes (for example, tags, barcodes, or matrix codes) are used to automate and simplify transactions, between a user of a consumer electronic device and a digital content source, for authorizing access to digital content items. Because such authorization is independent of the computer-readable visual symbols themselves, other users of other consumer electronic devices can use and share the same computer-readable visual symbols to obtain access to the same digital content items.

Figure 1:
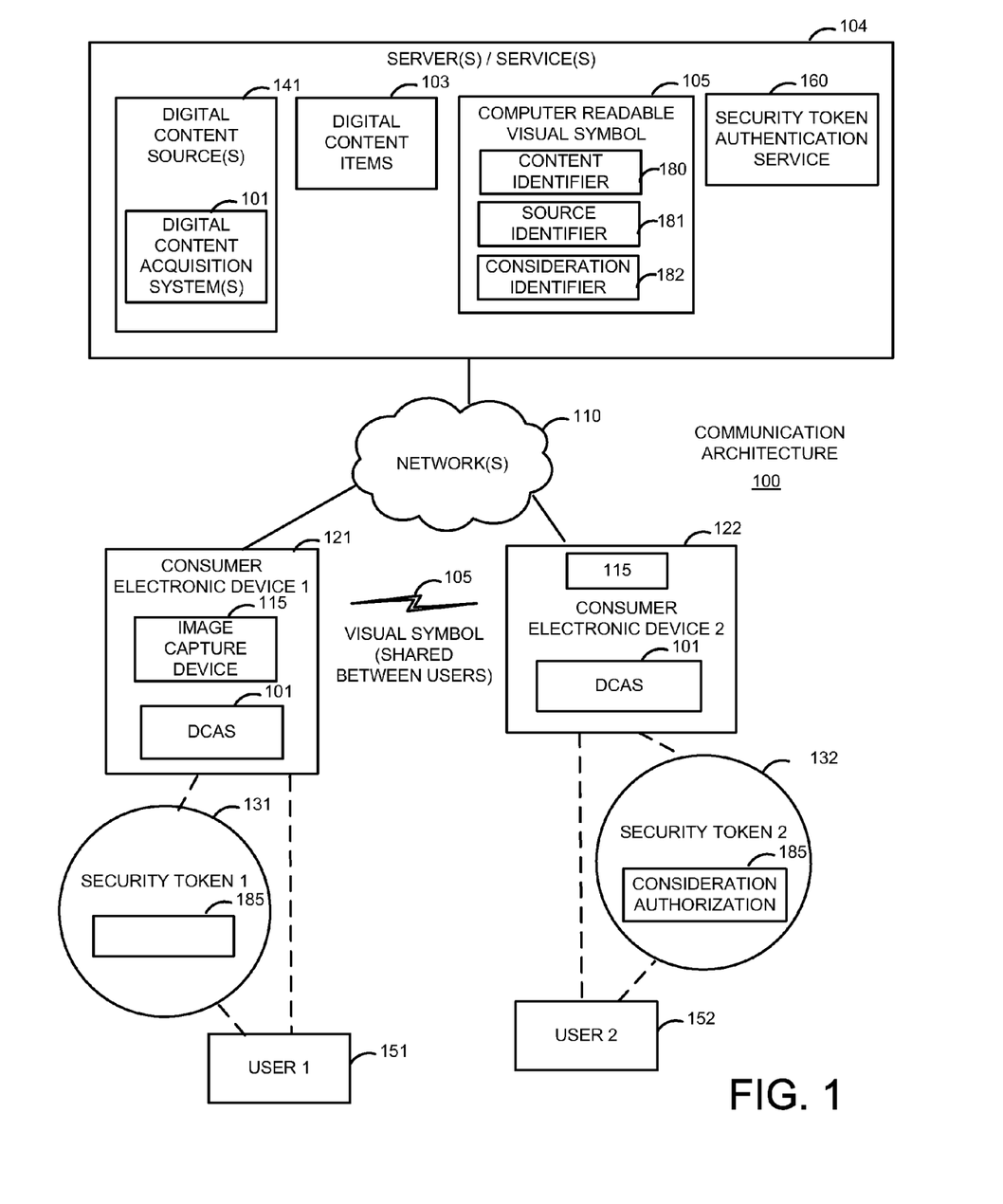
FIG. 1 is a simplified block diagram of an exemplary communication architecture within which aspects of a digital content acquisition system may be implemented or used.

Turning to the drawings, where like numerals designate like components, FIG. 1 is a simplified block diagram of an exemplary communication architecture 100 within which aspects of a digital content acquisition system ("DCAS") 101 may be implemented or used. DCAS 101 facilitates automated transactions, between a user of a consumer electronic device (two consumer electronic devices are shown, consumer electronic device1 121 operated by user1 151 and consumer electronic device 122 operated by user2 152) and a particular network-based digital content source, for authorizing user access to digital content items 103 available from the network-based digital content source via the use of computer-readable visual symbols 105 that are associated with particular digital content items 103.

Aspects of DCAS 101 are implemented within one or more network-based operating environments such as servers/services 104 (one shown) within network(s) 110 and/or within client-based operating environments. Two exemplary client-based operating environments are shown, consumer electronic device 121 operated by user1 151, and consumer electronic device 122 operated by user2 152. In general, design choices dictate how specific functions of DCAS 101 are implemented. Such functions may be implemented using hardware, software, firmware, or combinations thereof.

Digital content items 103 represent any item or service available for transfer to or access by a user of a consumer electronic device. Examples of digital content items 103 include but are not limited to: video files; audio files; image files; graphics files; text files; multimedia files; metadata files; playlists; computer programs; and subscriptions to services (such as Internet access, email access, RSS feeds, and the like); and redeemable items such as electronic coupons or discounts. Digital content items 103 are generally stored on network-accessible computer-readable media (computer-readable media 304 are discussed in connection with FIG. 3) in any known or later developed format, and distributed or otherwise made available for access from one or more network-side digital content sources 141. As used herein, the term "distribute" and forms thereof includes both acts associated with transferring a digital content item itself, and acts associated with otherwise making a digital content item available for access by a user.

Consumer electronic device1 121 and consumer electronic device2 122 represent any known or later developed portable or non-portable consumer devices (or any combination of physical or logical devices/functions), including but not limited to: personal computers; telecommunication devices; personal digital assistants; media players; home entertainment devices (such as a set-top boxes, game consoles, televisions, etc.); devices temporarily or permanently mounted in transportation equipment such as wheeled vehicles, planes, or trains; cameras; video recorders; and home servers.

Consumer electronic devices 121 and 122 may include or be responsive to image capture devices 115. Image capture devices 115 represent any hardware, software, or firmware capable of reproducing computer-readable visual symbols 105 in whole or in part. Examples of image capture devices include but are not limited to: cameras; video recorders; scanners; computer-executable instructions operable to copy and/or decode images; and the like.

Security tokens (two shown, security token1 131 and security token2 132) represent any aspect of any known or later developed hardware, software, firmware or combinations thereof that an authorized user of a consumer electronic device (such as user1 151 of consumer electronic device1 121 or user2 152 of consumer electronic device2 122) uses to facilitate one-way or two-way authentication of transactions between the authorized user and a network-based server/service 104. As shown, consideration authorization 185 forms part of security tokens 131 and 132. Consideration authorization 185 is an explicit or implicit promise, effected by security tokens 131 and 132, by a user of a particular consumer electronic device to provide the consideration (if any) due from the user (specified by consideration identifier 182, discussed further below) in exchange for receiving access to a particular digital content item 103 via DCAS 101. Examples of consideration authorizations 185 include but are not limited to: bank or other payment account numbers; credit card numbers; e-signatures for contracts; and any other form of automatic consideration authorization known or later developed.

It is possible but not necessary for an aspect of a particular security token to have a physical and/or logical connection to a particular consumer electronic device. Examples of security tokens include but are not limited to aspects of: Microsoft® Tags; smart cards; USB tokens; Bluetooth tokens; disconnected tokens that have neither a logical nor physical connection to any consumer electronic device; contactless tokens that form a logical but not physical connection to a client computing device; and virtual tokens. Cryptographic information or operations (such as keys, digital signatures, passwords or other identifiers, or biometric data) may be stored and/or used in connection with some security token schemes, and security tokens are considered to encompass such cryptographic information or operations. Security tokens and information associated therewith may be predetermined or created/identified in connection with a particular transaction between a particular user/consumer electronic device and a network-based server/service 104.

Referring again to consumer electronic devices 121 and 122, generally, consumer electronic devices 121 and 122 are configured for communication via one or more networks 110. Network(s) 110 represent any existing or future, public or private, wired or wireless, wide-area or local-area, packet-switched or circuit-switched, one-way or two-way data transmission infrastructures, technologies, or signals. Exemplary networks include: the Internet; local area networks; personal networks; and managed WANs (for example, cellular networks, satellite networks, fiber-optic networks, co-axial cable networks, hybrid networks, copper wire networks, and over-the-air broadcasting networks).

Servers/services 104 represent any network-side implementations of systems or techniques described herein. For example, one or more network-based servers may host a variety of services associated with DCAS 101, including but not limited to: digital content storage services; digital content distribution services; visual symbol generation, encoding/decoding or protection services; and/or authentication/authorization services (for example, security token authentication service 160).

Computer-readable visual symbols 105 are any known or later developed n-dimensional symbols of any pre-defined sizes or geometries, having visual symbologies that encode information. Any type of information may be encoded, including but not limited to: content identifiers 180, which are references (such as URLs, pointers, vectors, variables, computer programs/interfaces and the like) to one or more digital content items 103; source identifiers 181, which are references (such as URLs, pointers, vectors, variables, computer programs/interfaces and the like) to one or more digital content sources 141 responsible for authorizing access to the one or more digital content items; and consideration identifiers 182, which are references to consideration (if any) due from a user in exchange for receiving access to particular digital content items. Examples of consideration include but are not limited to: monetary payments or promises to pay money; performance of services such as consumption of advertising or promises to consume advertising (or performance of any other legal services); and providing goods or promises to provide goods.

Computer-readable visual symbols 105 are presentable on one or more surfaces. Any surface is possible—examples of particular surfaces include: electronic display screens (such as LCDs, plasma panels, or CRT screens); printed surfaces, such as paper; or any other surfaces on which information can be displayed, such as glass, fabric, or metal.

Exemplary computer-readable symbols include but are not limited to: barcodes; matrix codes such as QR codes; and tags. A QR code, for example, is a two-dimensional (often square) symbol of a predetermined size (one inch by one inch is an exemplary size, although virtually any desired size is possible), having a number of modules (for example, square modules) that are used to encode information. A particular module has a binary reflectance value corresponding to either "black" or "white," arranged on a surface in accordance with a coordinate system defined by a vertical axis and a horizontal axis. Generally, certain groups of modules are arranged within a particular QR code in predefined manners to facilitate decoding and information retrieval (for example, finder/alignment patterns and/or timing lines may be located in predetermined locations and used to identify the coordinate system of a QR code).

Figure 2:
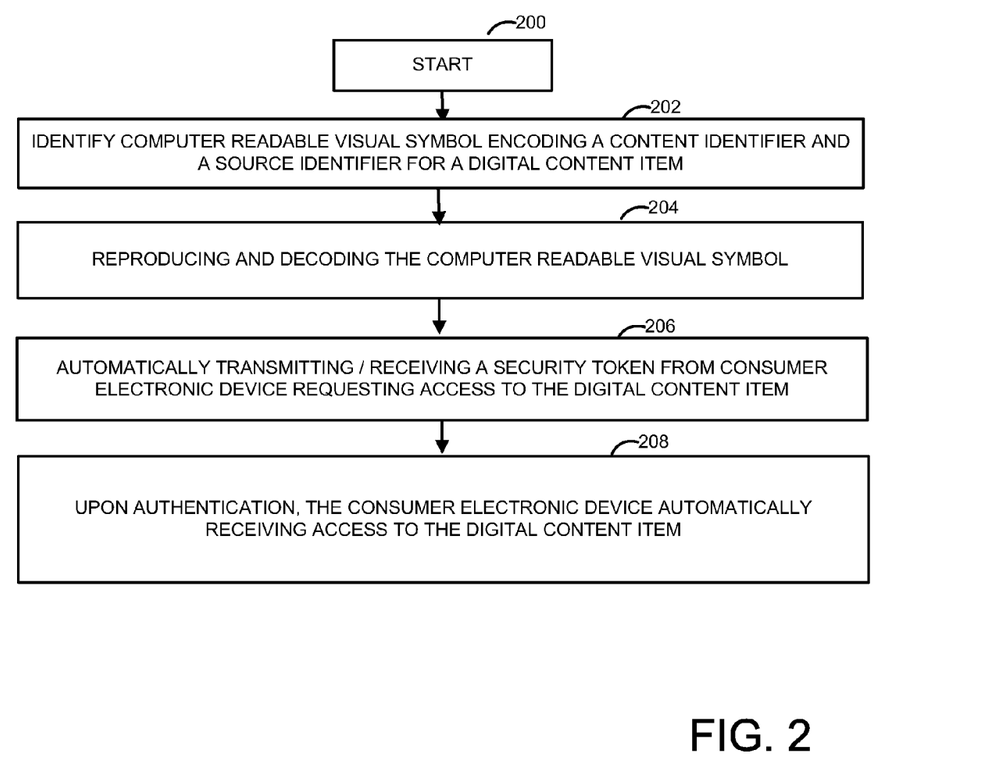
FIG. 2 is a flowchart illustrating certain aspects of a method for automatically distributing/acquiring a digital content item using aspects of the communication architecture and/or the digital content acquisition system shown in FIG. 1.

With continuing reference to FIG. 1, FIG. 2 is a flowchart illustrating certain aspects of a method for automatically distributing/acquiring one or more digital content items, such as one or more digital content items 103, using aspects of DCAS 101. The method(s) illustrated in FIG. 2 may be implemented using computer-executable instructions executed by one or more general, multi-purpose, or single-purpose processors (exemplary computer-executable instructions 306 and processor 302 are discussed further below, in connection with FIG. 3). It will be appreciated that the method of FIG. 2 is exemplary in nature, and that the subject matter defined in the claims is not necessarily limited to the specific features or acts described below. Rather, the specific features and acts described above are disclosed as example forms of implementing the claims. Unless specifically stated, the methods described herein are not constrained to a particular order or sequence. In addition, some of the described method or elements thereof can occur or be performed concurrently. It will be understood that all of the steps shown need not occur in performance of the functions described herein—for exemplary purposes, the flowchart of FIG. 2 describes both network-side and/or client-side activities.

The method begins at block 200, and continues at block 202, where a computer-readable visual symbol, such as a computer-readable visual symbol 105 (for example, a barcode, matrix code, tag, or other known or later developed visual symbol), is identified. The computer-readable visual symbol encodes a content identifier, such as content identifier 180, referencing one or more particular digital content items, such as a particular content item 103, and a source identifier, such as source identifier 181, referencing one or more particular digital content sources, such as digital content source 141, responsible for distributing/authorizing access to the digital content item(s). The computer-readable visual symbol may also encode a consideration identifier 182, which identifies consideration (if any) due from a user in exchange for receiving access to the particular digital content item(s). The computer-readable visual symbol may have originated from network-side DCAS 101, digital content source(s) 141, or another entity, and may also be a reproduction or a reference to such an original symbol, shared between consumer electronic devices. The computer-readable visual symbol may be in physical or electronic form, and may be presented on any surface including but not limited to an electronic display screen (such as an LCD, a plasma panel, or a CRT screen); paper; glass, fabric, metal, etc.

Next, as indicated at block 204, a consumer electronic device operated by a user, such as consumer electronic device1 121 operated by user1 151 or consumer electronic device2 122 operated by user2 152, reproduces and decodes at least a portion of the computer-readable visual symbol to ascertain the one or more digital content sources from which the desired digital content item(s) may be obtained, and automatically transmits a request to access the digital content item(s) associated with the computer-readable visual symbol. The request includes (or is followed or preceded by) transmission of a security token. The request and security token are transmitted to the same or different network-side entity, such as a network-based digital content source, or a network-based service designated by the computer-readable visual symbol or the applicable digital content source.

In one exemplary scenario, image capture device 115, which in one implementation is integral to the consumer electronic device, captures an image of the visual symbol from the surface on which it is presented. In another exemplary scenario, the consumer electronic device executes computer-executable instructions to electronically reproduce the visual symbol (or receive a reproduction of the visual symbol from another device, such as another consumer electronic device).

In the exemplary scenario, source identifier 181 may be, or may refer to, instructions that permit an automatic programmatic interaction between a particular consumer electronic device and one or more network-based services such as DCAS 101 and/or security token authentication service 160, associated with a particular digital content source 141. For example, the transmission of the security token may occur automatically when client-side DCAS 101 within the consumer electronic device reproduces and decodes at least a portion of computer-readable visual symbol 105. The acts of reproducing or decoding, which may include clicking on or otherwise selecting at least a portion of the computer-readable visual symbol, may be taken as consent to transmit the security token. The security token may also include consideration authorization 185, which automatically authorizes provisioning of any applicable consideration due from the user that is specified by consideration identifier 182. For discussion purposes, it is assumed that appropriate electronic security/privacy protections have been implemented to protect the user, the security token, and/or the consideration authorization, and that the security token is authentic and valid. Authentication, authorization, and accounting activities may be performed by DCAS 101 or another network-based service, such as security token authentication service 160.

Upon receipt and authentication of the security token, the consumer electronic device automatically receives/is given authorization to access to the digital content item(s) from/by the applicable network-based digital content source 141, as indicated at block 206. The digital content item(s) may be stored at a location associated with the digital content source, or at another designated location. The digital content item(s) may be distributed or accessed on a push or pull basis, using any known or later developed protocol or technique, in the same or a different manner or communication session as used to discover and/or request the digital content item(s). In one exemplary scenario, digital content item(s) are automatically wirelessly transmitted to the consumer electronic device via one or more network(s) 110.

In this manner, the process of obtaining digital content from various digital content sources is simplified and automated, the chore of discovering and obtaining fresh digital content is reduced, and user satisfaction is enhanced. Users of consumer electronic devices can use and share the same computer-readable visual symbols to obtain access to the same digital content items.

Figure 3:
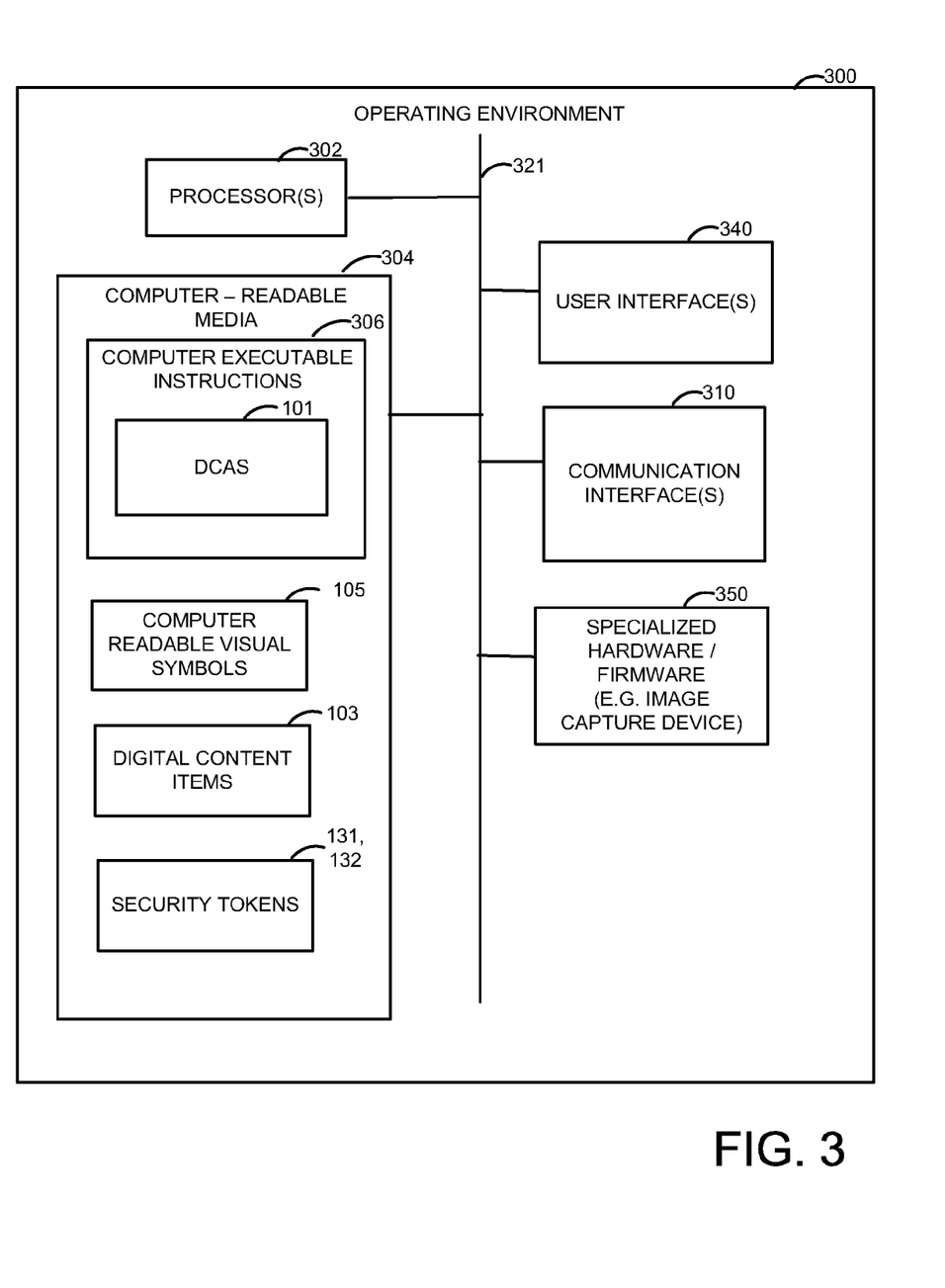
FIG. 3 is a simplified block diagram of an exemplary operating environment in which aspects of the digital content acquisition system shown in FIG. 1 and/or the method(s) shown in FIG. 2 may be implemented or used.

With continuing reference to FIGS. 1 and 2, FIG. 3 is a simplified block diagram of an exemplary operating environment 300 in which aspects of DCAS 101 and/or the method(s) shown in FIG. 2 may be implemented or used. Operating environment 300 is generally indicative of a wide variety of general-purpose or special-purpose computing environments, and is not intended to suggest any limitation as to the scope of use or functionality of the system(s) and methods described herein. For example, operating environment 300 may be a consumer electronic device such as a mobile phone, a personal digital assistant, a personal computer, a personal media player, a computer/television device, a set-top box, a hard-drive storage device, a video camera, a DVD player, a cable modem, a local media gateway, a device temporarily or permanently mounted in transportation equipment such as a wheeled vehicle, a plane, or a train, or another type of known or later developed consumer electronic device. Operating environment 300 may also be a type of networked server, or any aspect thereof. Such a server may be part of a distributed computing network, and may be used to implement, host, or proxy any type of network-based service in whole or in part.

As shown, operating environment 300 includes processor(s) 302, computer-readable media 304, computer-executable instructions 306, user interface(s) 340, network interface(s) 310, and specialized hardware/firmware 350. One or more internal buses 321 may be used to carry data, addresses, control signals, and other information within, to, or from operating environment 300 or elements thereof.

Processor 302, which may be a real or a virtual processor, controls functions of the operating environment by executing computer-executable instructions 306. The processor may execute instructions at the assembly, compiled, or machine-level to perform a particular process.

Computer-readable media 304 may represent any number and combination of local or remote devices, in any form, now known or later developed, capable of recording, storing, or transmitting computer-readable data. In particular, computer-readable media 304 may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; or any combination thereof. The computer-readable media may also include transmission media and data associated therewith. Examples of transmission media/data include, but are not limited to, data embodied in any form of wireline or wireless transmission, such as packetized or non-packetized data carried by a modulated carrier signal.

Computer-executable instructions 306 represent any signal processing methods or stored instructions. Generally, computer-executable instructions 306 are implemented as software components according to well-known practices for component-based software development, and encoded in computer-readable media. Computer programs may be combined or distributed in various ways. Computer-executable instructions 306, however, are not limited to implementation by any specific embodiments of computer programs, and in other instances may be implemented by, or executed in, hardware, software, firmware, or any combination thereof.

User interface(s) 340 represents the combination of physical or logical presentation tools and controls that define the way a user interacts with a particular application or device, such as DCAS 101, networked server(s)/service(s) 104 within network(s) 110, electronic device 103, or portable electronic device 102. Presentation tools are used to provide output to a user. An example of a physical presentation tool is a display such as a monitor device. An example of a logical presentation tool is a data organization technique (for example, a window, a menu, or a layout thereof). Controls facilitate the receipt of input from a user. An example of a physical control is an input device such as a remote control, a display, a mouse, a pen, a stylus, a trackball, a keyboard, a microphone, or a scanning device. An example of a logical control is a data organization technique (for example, a window, a menu, or a layout thereof) via which a user may issue commands. It will be appreciated that the same physical device or logical construct may function to provide outputs to, and receive inputs from, a user.

Communication interface(s) 310 represent one or more physical or logical elements, such as connectivity devices or computer-executable instructions, which enable communication between operating environment 300 and external devices or services, via one or more protocols or techniques. Such communication may be, but is not necessarily, client-server type communication or peer-to-peer communication. Information received at a given network interface may traverse one or more layers of a communication protocol stack.

Specialized hardware 350 represents any hardware or firmware that implements functions of operating environment 300. Examples of specialized hardware include encoder/decoders decrypters, application-specific integrated circuits, clocks, image capture device 115, and the like.

It will be appreciated that particular configurations of operating environment 300 may include fewer, more, or different components or functions than those described. In addition, functional components of operating environment 300 may be implemented by one or more devices, which are co-located or remotely located, in a variety of ways.

Functions/components described herein as being computer programs are not limited to implementation by any specific embodiments of computer programs. Rather, such functions/components are processes that convey or transform data, and may generally be implemented by, or executed in, hardware, software, firmware, or any combination thereof.

It will be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be construed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

What is claimed is:

1. A computer-implemented method for acquiring a digital content item, comprising:
   a first identifying step of identifying a digital content item;
   a second identifying step of identifying a computer-readable visual symbol associated with the digital content item, the computer-readable visual symbol comprising a visual symbology presented on a surface, the visual symbology encoding a content identifier, a source identifier and a consideration identifier, the content identifier referencing the digital content item, the source identifier referencing a digital content source responsible for authorizing access to the digital content item and the consideration identifier identifying consideration, if any, due from a user in exchange for receiving authorization for access to the digital content item;

reproducing at least a portion of the computer-readable visual symbol using a consumer electronic device operated by a user, a security token linking the consumer electronic device and the user, wherein reproducing the computer-readable visual symbol comprises electronically receiving the computer-readable visual symbol from a second consumer electronic device linked to a second user;

decoding at least a portion of the reproduced visual symbology to identify the digital content source;

based on decoding, automatically transmitting a request for access to the digital content item to the digital content source, the request including the security token, wherein the security token includes consideration authorization automatically authorizing the provisioning of consideration based upon the consideration identifier identified in the visual symbol; and based on the request, automatically receiving from the digital content source an authorization for the consumer electronic device to access the digital content item referenced by the content identifier encoded in the visual symbology of the computer-readable visual symbol identified in said second identifying step.

2. The computer-implemented method according to claim 1, wherein reproducing at least a portion of the computer-readable visual symbol comprises
via an image capture device, capturing an image of at least a portion of the computer-readable visual symbol, the captured image comprising the reproduction of the computer-readable visual symbol.

3. The computer-implemented method according to claim 1, wherein reproducing at least a portion of the computer-readable visual symbol comprises
electronically copying at least a portion of the computer-readable visual symbol using the consumer electronic device, the electronic copy comprising the reproduction of the computer-readable visual symbol.

4. The computer-implemented method according to claim 1, wherein the authorization comprises a transmission of the digital content item.

5. The computer-implemented method according to claim 1, wherein presenting the computer-readable visual symbol on a surface is selected from the group comprising: displaying the computer-readable visual symbol via a user interface of an electronic device; and displaying the computer-readable visual symbol on a physical surface.

6. A computer-implemented method for distributing a digital content item, comprising:
identifying a computer-readable visual symbol comprising a visual symbology, the visual symbology encoding a content identifier, a source identifier and a consideration identifier, the content identifier referencing a digital content item, the source identifier referencing a digital content source responsible for distributing the digital content item and the consideration identifier identifying consideration, if any, due from a user in exchange for receiving authorization for access to the digital content item;
presenting the computer-readable visual symbol on a surface;
based on a first consumer electronic device operated by a first user reproducing and decoding at least a portion of the visual symbology to ascertain the digital content source, receiving a security token from the consumer electronic device, the security token linking the user and the consumer electronic device, wherein the reproducing comprises electronically receiving the computer-readable visual symbol from a second consumer electronic device linked to a second user;
authenticating the security token, wherein the security token includes consideration authorization automatically authorizing the provisioning of consideration based upon the consideration identifier identified in the visual symbol; and
based on the authentication, authorizing the distribution of the digital content item referenced by the content identifier encoded in the visual symbology of the computer-readable visual symbol identified in said identifying step from the digital content source to the consumer electronic device,
the digital content item distributed automatically to the consumer electronic device.

7. The computer-implemented method according to claim 6, wherein the digital content item is selected from the group comprising: one or more video files; one or more audio files; one or more graphics files; one or more text files; one or more image files; one or more multimedia files; one or more service subscriptions; one or more computer programs; and a group of files comprising one or more video files, audio files, graphics files, text files, image files, computer programs, or multimedia files.

8. The computer-implemented method according to claim 6, wherein the reproduction security token is received by an entity selected from the group comprising: the digital content source; and a network-based authentication service.

9. The computer-implemented method according to claim 6, wherein identifying the computer-readable visual symbol comprises generating the computer-readable visual symbol.

10. The computer-implemented method according to claim 6, wherein the first consumer electronic device includes an image capture device, and wherein the reproducing comprises capturing an image using the image capture device.

11. The computer-implemented method according to claim 6, wherein the reproducing comprises electronically copying the computer-readable visual symbol.

12. The computer-implemented method according to claim 11, wherein electronically copying comprises receiving the computer-readable visual symbol from the second different consumer electronic device.

13. A consumer electronic device operable by a user, comprising:
an image capture device;
a computer-readable storage medium; and
a processor responsive to the computer-readable storage medium and to a computer program stored within the computer-readable storage medium, the computer program, when loaded into the processor, operable to perform a method comprising:
capturing an image of at least a portion of a computer-readable visual symbol via the image capture device provided by a different consumer electronics device linked to a different user, the computer-readable visual symbol associated with a digital content item and comprising a visual symbology presented on a surface, the visual symbology encoding a content identifier, a source identifier, and a consideration identifier, the content identifier referencing the digital content item, the source identifier referencing a digital content source responsible for authorizing access to the digital content item, and the consideration identifier identifying consideration due from the user in exchange for the digital content source authorizing access to the digital content item;
automatically decoding at least a portion of the image to identify the digital content source;

based on decoding, automatically transmitting a request for access to the digital content item the image and a security token to the digital content source, the transmission of the security token serving to automatically authorize provision of the consideration due from the user based upon the consideration identifier identified in the visual symbology; and based on transmitting, automatically receiving access to the digital content item referenced by the content identifier encoded in the visual symbology of the computer-readable visual symbol from the digital content source.

14. The consumer electronic device according to claim 13, wherein the consumer electronic device is selected from the group comprising: a mobile phone; a digital camera; a personal digital assistant; a personal computer; a portable media player; and a navigation device.

15. The consumer electronic device according to claim 13, wherein the access to the digital content item comprises wirelessly receiving the digital content item.

* * * * *